US011106902B2

(12) United States Patent
Li et al.

(10) Patent No.: US 11,106,902 B2
(45) Date of Patent: Aug. 31, 2021

(54) INTERACTION DETECTION MODEL FOR IDENTIFYING HUMAN-OBJECT INTERACTIONS IN IMAGE CONTENT

(71) Applicant: Adobe Inc., San Jose, CA (US)

(72) Inventors: Zimo Li, Los Angeles, CA (US); Vladimir Kim, Seattle, WA (US); Mehmet Ersin Yumer, San Jose, CA (US)

(73) Assignee: ADOBE INC., San Jose, CA (US)

( * ) Notice: Subject to any disclaimer, the term of this patent is extended or adjusted under 35 U.S.C. 154(b) by 429 days.

(21) Appl. No.: 15/920,027

(22) Filed: Mar. 13, 2018

(65) Prior Publication Data
US 2019/0286892 A1 Sep. 19, 2019

(51) Int. Cl.
*G06K 9/00* (2006.01)
*G06K 9/46* (2006.01)
*G06N 5/04* (2006.01)
*G06T 7/70* (2017.01)

(52) U.S. Cl.
CPC ........... *G06K 9/00369* (2013.01); *G06K 9/46* (2013.01); *G06N 5/046* (2013.01); *G06T 7/70* (2017.01); *G06T 2207/20081* (2013.01); *G06T 2207/30196* (2013.01)

(58) Field of Classification Search
CPC ............ G06K 9/00335–00389; G06T 7/70–77
See application file for complete search history.

(56) References Cited

U.S. PATENT DOCUMENTS

| 2009/0027412 A1* | 1/2009 | Burley ............. G06T 15/04 345/582 |
| 2014/0270482 A1* | 9/2014 | Chakraborty ...... G06K 9/00221 382/154 |
| 2017/0097967 A1* | 4/2017 | Savliwala ............ G06Q 30/02 |

OTHER PUBLICATIONS

Gkioxari, Georgia, et al. "Detecting and recognizing human-object interactions." arXiv.org. https://arxiv.org/abs/1704.07333v1, Apr. 24, 2017. (Year: 2017).*

(Continued)

*Primary Examiner* — Vincent Rudolph
*Assistant Examiner* — Raphael Schwartz
(74) *Attorney, Agent, or Firm* — Kilpatrick Townsend & Stockton LLP (57) ABSTRACT

Certain embodiments detect human-object interactions in image content. For example, human-object interaction metadata is applied to an input image, thereby identifying contact between a part of a depicted human and a part of a depicted object. Applying the human-object interaction metadata involves computing a joint-location heat map by applying a pose estimation subnet to the input image and a contact-point heat map by applying an object contact subnet to the to the input image. The human-object interaction metadata is generated by applying an interaction-detection subnet to the joint-location heat map and the contact-point heat map. The interaction-detection subnet is trained to identify an interaction based on joint-object contact pairs, where a joint-object contact pair includes a relationship between a human joint location and a contact point. An image search system or other computing system is provided with access to the input image having the human-object interaction metadata.

20 Claims, 6 Drawing Sheets

(56) References Cited

OTHER PUBLICATIONS

Nguyen, Anh, et al. "Detecting object affordances with convolutional neural networks." 2016 IEEE/RSJ International Conference on Intelligent Robots and Systems (IROS). IEEE, 2016. (Year: 2016).*
Zhu, Yuke, et al., "Reasoning About Object Affordances in a Knowledge Base Representation", European Conference on Computer Vision, Computer Vision, Sep. 2014, 16 pages.
Gkioxari, Georgia, "Detecting and Recognizing Human-Object Interactions", Computer Science, Computer Vision and Pattern Recognition, arXiv:1704.07333,v1 [cs.CV], Apr. 24, 2017, 9 pages.
Chao, Yu-Wei, "Learning to Detect Human-Object Interactions", Computer Science, Computer Vision and Pattern Recognition, arXiv:1702.054481v1 [cs.CV], Feb. 17, 2017, 10 pages.
Atzmon, Yuval, et al., "Learning to Generalize to New Compositions in Image Understanding", arXiv preprint arXiv:1608.07639, Aug. 2016, 8 pages.
Cao, Zhe, et. al., "Realtime Multiperson 2d Pose Estimation Using Part Affinity Fields", arXiv preprint arXiv:1611.08050, Nov. 2016, 9 pages.
Chao, Yu-Wei, et al., "Learning to Detect Human-Object Interactions", Arxiv Preprint Arxiv:1702.05448, Feb. 2017, 10 pages.
Chao, Yu-Wei, et al., "HICO: A Benchmark for Recognizing Human-Object Interactions in Images" In Proceedings of the IEEE International Conference on Computer Vision, , Dec. 2015, 9 pages.
Delaitre, et al, "Learning Person Object Interactions for Action Recognition in Still Images", In Advances in Neural Information Processing Systems, 2011, 9 pages.
Desai, Chaitanya "Detecting Actions, Poses, and Objects With Relational Phraselets", Computer Vision—ECCV, 2012, 2 pages.
Desai, Chaitanya, "Discriminative Models for Static Human-Object Interactions", In Computer vision and pattern recognition workshops (CVPRW), 2010 IEEE computer society conference, IEEE, 2010, 8 pages.
Fritz, Gerald Learning Predictive Features in Affordance Based Robotic Perception Systems, In Intelligent Robots and Systems, Oct. 2006, 8 pages.
Gibson, James J., "The Ecological Approach to Visual Perception", Houghton Mifflin, 1979, 7 pages.
Girshick., Ross "Fast R-CNN", In Proceedings of the IEEE international conference on computer vision, Apr. 2015, 9 Pages.
Girshick., Ross, et al., Region-based Convolutional Networks for Accurate Object Detection and Segmentation. IEEE transactions on pattern analysis and machine intelligence, vol. 38, Issue , Jan. 2016, 16 pages.
Gkioxari, Georgia,, et al., Detecting and Recognizing Human-Object Interactions. arXiv preprint arXiv:1704.07333,, Apr. 2017, 10 pages.
Gkioxari, Georgia,, et al, "Contextual Action Recognition With R* CNN", In Proceedings of the IEEE international conference on computer vision, 2015, 9 pages.
Goldfeder, Corey, et al., "Data-Driven Grasping", Auton. Robots, 31(1):1-20, Jul. 2011, 160 pages.
Grabner, Helmut, et al., "What Makes a Chair a Chair?", Computer Vision and Pattern Recognition (CVPR), Jun. 2011, 8 pages.
Gupta, Abhinav, et al., "From 3D Scene Geometry to Human Workspace", In Computer Vision Pattern Recognition,(CVPR) 2011, 8 pages.
Gupta Saurabh, et al., "Visual Semantic Role Labeling", arXiv preprint arXiv:1505.04474, May 2015, 11 pages.
Hermans, Tucker et al., "Affordance Prediction via Learned Object Attributes", ICRA, 2011, 8 pages.
Hu, Jian-Fang, et al., "Recognising Human-Object Interaction via Exemplar Based Modelling", In Proceedings of the IEEE International Conference on Computer Vision, 2013, 8 pages.
Yun, Jiang, et al., "Hallucinated Humans as the Hidden Context for Labeling 3D Scenes", Computer Vision and Pattern Recognition (CVPR), Jun. 2013, 8 pages.
Kim, Vladimir G., "Shape2pose: Human-Centric Shape Analysis" ACM Transactions on Graphics (TOG), 33(4):120, 2014, 12 pages.
Kjellstrom, Hedvig, et al., "Visual Object Action Recognition: Inferring Object Affordances From Human Demonstration", Computer Vision and Image Understanding, 115(1):81-90, 2011, 10 pages.
Lenz, Ian, et al., "Deep Learning for Detecting Robotic Grasps", In RSS, 2013, reprint arXiv:1301.3592v6, Aug. 2014, 17 pages.
Lenz, Ian, et al., "Deep Learning for Detecting Robotic Grasps", The International Journal of Robotics Research, 34(4-5):705-724, Mar. 2015, 3 pages.
Levine, Sergey, et al., Learning Hand-Eye Coordination for Robotic Grasping With Deep Learning and Large-Scale Data Collection. In International Journal of Robotics Research, (IJRR), Jun. 2017, 16 pages.
Myers, Austin, et al, "Affordance Detection of Tool Parts From Geometric Features", In Robotics and Automation (ICRA), 2015 IEEE International Conference on, pp. 1374-1381. IEEE, 2015.
Nguyen, Anh, et al., "Detecting Object Affordances With Convolutional Neural Networks", IEEE/RSJ International Conference on Intelligent Robots and Systems (IROS), 2016, 6 pages.
Prest, Alessandro, et al, "Weakly Supervised Learning of Interactions Between Humans and Objects", IEEE Transactions on Pattern Analysis and Machine Intelligence, 34(3), 2012, 14 pages.
Ren, Shaoqing, et al., "Faster R-Cnn: Towards Real-Time Object Detection With Region Proposal Networks", In Advances in Neural Information Processing Systems, 2015, 9 pages.
Sawatzky, Johann, et al., "Weakly Supervised Affordance Detection", Computer Vision and Pattern Recognition, May 2016, 10 pages.
Saxena, Ashutosh, "Monocular Depth Perception and Robotic Grasping of Novel Objects", PhD thesis, Stanford University, 2009, 217 pages.
Saxena, Ashutosh , et al., "Robotic Grasping of Novel Objects" In NIPS, 2006.
Schoeler, Markus, et al., "Bootstrapping the Semantics of Tools: Affordance Analysis of Real World Objects on a Per-part Basis", IEEE Transactions on Cognitive and Developmental Systems, 8(2), Jun. 2016, 2 pages.
Wei, Shih-En, et al, "Convolutional Pose Machines" In Proceedings of the IEEE Conference on Computer Vision and Pattern Recognition, 2016, 9 pages.
Wu, Jiajun et al., "Single Image 3D Interpreter Network", In European Conference on Computer Vision (ECCV), 2016, 18 pages.
Yao, Bangpeng, et al., Human Action Recognition by Learning Bases of Action Attributes and Parts, In Computer Vision (ICCV), IEEE International Conference IEEE, 2011, 11 pages.
Yao, Bangpeng, et al, "Discovering Object functionality", .In ICCV. IEEE, 2013, 8 pages.

* cited by examiner

INTERACTION DETECTION MODEL FOR IDENTIFYING HUMAN-OBJECT INTERACTIONS IN IMAGE CONTENT

TECHNICAL FIELD

This disclosure relates generally to machine-learning systems that transform an image by generating metadata or other explanatory data providing descriptions of the image's content. More specifically, but not by way of limitation, this disclosure relates to enhancing image content for searches and other applications by using interaction detection models to identify human-object interactions in the image content.

BACKGROUND

Image-analysis applications are often used to derive information about content depicted in one or more images. For instance, objection localization algorithms determine the location of objects in images. Image captioning applications can use these algorithms to describe objects in pictures by combining identified objects with a relationship based on the relative location of the objects. Additionally, neural networks can be used to determine the interaction between people and objects using machine learning to associate person-object pairs with certain interactions.

Existing image-analysis techniques present disadvantages. For example, current algorithms make assumptions about the interaction based on the person and object identified. If a person is identified next to a bicycle, these algorithms may assume the person is riding a bicycle because that is the most common relationship between the two objects. Other algorithms will attempt not only to identify interactions based on the person and object identified, but will compare the current image to other images of the same action. Therefore, if a person is next to a bicycle, riding a bicycle and washing a bicycle may both be possible interactions between the two objects. The application would then evaluate the image for similarities to other images involving riding and washing.

However, these existing techniques still involve an assumption about whether the person is interacting with the object at all. These techniques also fail to provide more detailed information about the interactions in the image (e.g., specific parts of the person and object that are in contact). Thus, conventional image-analysis techniques are often unsatisfactory for answering specific questions about the nature of interactions that might be depicted in images.

SUMMARY

Certain embodiments involve enhancing image content for searches and other applications by using interaction detection models to identify human-object interactions in the image content. For example, human-object interaction metadata is applied to an input image, thereby identifying contact between a part of a depicted human and a part of a depicted object. Applying the human-object interaction metadata involves computing a joint-location heat map by applying a pose estimation subnet to the input image and a contact-point heat map by applying an object contact subnet to the to the input image. The human-object interaction metadata is generated by applying an interaction-detection subnet to the joint-location heat map and the contact-point heat map. The interaction-detection subnet is trained to identify an interaction based on joint-object contact pairs. A joint-object contact pair includes a relationship between a human joint location and a contact point. An image search system or other computing system is provided with access to the input image having the human-object interaction metadata.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve image-analysis algorithms that use interaction detection models to identify human-object interactions in the image content. For example, an interaction detection model receives an input image and uses various subnets, in combination, to generate metadata or other information describing the human-object interactions. A first subnet (e.g., a pose estimation subnet, such as a convolutional pose machine) identifies which human joints (e.g., elbows, feet, etc.) are depicted in the image, and second subnet (e.g., an object contact subnet) identifies which contact points (e.g., parts of an object) are depicted in the image.

The following non-limiting example is provided to introduce certain embodiments. In this example, an image-analysis engine accesses an input image that depicts a person riding a bicycle. The image-analysis engine applies an interaction detection network to the input image and thereby generates human-object interaction metadata that can be used to augment or otherwise transform the input image. For instance, the interaction detection network includes a pose estimation subnet for identifying joint locations of humans in an image (e.g., the rider's hands, elbows, feet, etc.) and an object contact subnet for identifying potential contact points in the image (e.g., the bicycle's seat, handles, wheels, etc.). The pose estimation subnet outputs a joint-location heat map indicating detected joints in the input image, and the object contact subnet outputs a contact-point heat map indicating potential contact points on the bicycle in the input image.

Continuing with this example, these outputted heat maps are provided to an interaction-detection subnet, which is trained to identify an interaction based on one or more joint-object contact pairs in the input image. The interaction-detection subnet determines which parts of the bicycle rider and part of the bicycle are likely to be in contact in input image. For instance, the interaction-detection subnet determines, based on the location of a person's hands, hips, and feet, that a person's hands and feet are in contact with the bicycle's handles, seat, and pedals, respectively. Based on this joint-object contact information, the engine can specifically determine that the person is riding the bicycle rather than interacting with the bicycle in some other manner (e.g., washing the bicycle, carrying the bicycle, or simply walking past the bicycle).

The image-analysis engine generates human-object interaction metadata that describes or otherwise indicates this determination by the interaction-detection subnet, and applies this metadata to the input image. A simplified example of this metadata is a tag such as "person carrying bicycle." The input image, as augmented with the metadata, can be used in applications that involve detecting specific interactions depicted in image content. For instance, the metadata can be used by a search engine to return the image as a result for relevant searches.

As described herein, certain embodiments provide improvements in image processing by automatically applying various rules of a particular type (e.g., various functions captured in one or more neural network models) to detect human-object interactions in images, which may facilitate applications such as controls of automated machines, image searches, etc. In one example, using one or more models described herein can allow for a more accurate detection of human-object interactions (e.g., avoiding false positives), a more precise detection of human-object interactions (e.g., providing detail about the nature of the interaction), or both. Additionally or alternatively, generating human-object interaction metadata using the embodiments described herein can allow image content to be indexed (e.g., using tags identifying interactions) for searching, thereby allowing faster or more accurate searching of image manipulation application data than would be possible with techniques described herein. Thus, the embodiments described herein provide improvements to computing systems that detect human-object interactions in image content for image searching or other relevant applications that require knowledge of these interactions within the content.

As used herein, the term "joint" is used to refer to image content depicting one or more joints of a human being or other figure depicted in an image, such as hands, elbows, knees, etc.

As used herein, the term "contact point" is used to refer to image content depicting one or more areas of an object that are intended to be grasped, pushed, held, or otherwise manipulated or contacted by a joint of a human being or other figure depicted in an image.

As used herein, the term "human-object interaction metadata" is used to refer to any searchable data that indicates the presence of one or more interactions between an object and a human or other figure depicted in an image. An example of human-object interaction metadata is a tag. In some embodiments, the human-object interaction metadata is applied to an image file or otherwise associated with a particular image file. Human-object interaction metadata may not be displayed when an associated image is displayed.

As used herein, the term "image" is used to refer to an electronic version of a photograph, one or more frames of electronic video content, electronic graphical content generated or modified with drawing tools, or some combination thereof.

Example of an Operating Environment for Detecting Human-Object Interactions

Figure 1:
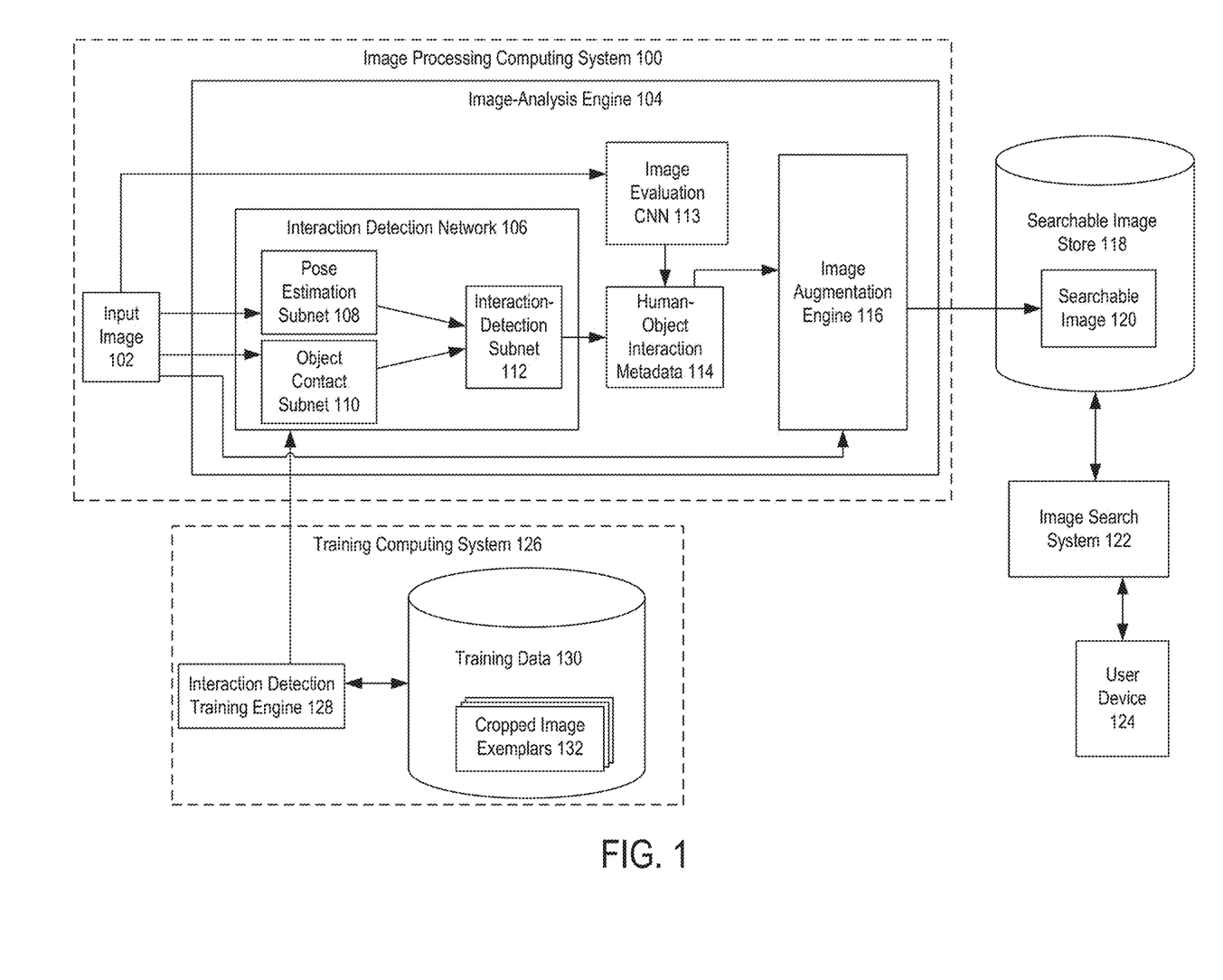
FIG. 1 depicts an example of an operating environment for enhancing image content for use by an image search system or other applications by identifying human-object interactions in the image content, according to certain embodiments of the present disclosure.

Referring now to the drawings, FIG. 1 depicts an example of an operating environment that involves enhancing image content for searches and other applications by using interaction detection models to identify human-object interactions in the image content. In this example, an image processing computing system 100 executes an image-analysis engine 104 that automatically detects human-object interactions in an input image 102 using an interaction detection network 106.

The image-analysis engine 104 include an interaction detection network 106 and an image augmentation engine 116. The image-analysis engine 104 applies the interaction detection network 106 to an input image 102, bounding boxes or other data associated with the input image 102, or both. The interaction detection network 106 generates human-object interaction metadata 114. The human-object interaction metadata 114 indicates specific interactions between a human depicted in an image and an object depicted in an image. The interaction detection network 106 generates this metadata by using information identifying the location of contact points on the object and joint locations of the person in order to make a determination of whether the person is interacting with the object and, if so, how the person is interacting with the object. The resulting human-object interaction metadata 114 information indicates whether the person is interacting with the object at all, how the person is interacting with the object, what parts of the human are in contact with the object, what parts of the object are in contact with the person, or some combination thereof. The image augmentation engine 116 transforms the input image 102 with the human-object interaction metadata 114. For example, the image augmentation engine 116 applies a tag, which includes (or is derived from) the human-object interaction metadata 114, to the input image 102 to generate a searchable image 120.

The interaction detection network 106 includes a pose estimation subnet 108, an object contact subnet 110, and an interaction-detection subnet 112. The pose estimation subnet 108 uses an input image 102 to generate a joint-location heat map. The object contact subnet 110 uses the input image 102 to generate a contact-point heat map. The interaction-detection subnet 112 uses the joint-location heat map and the contact-point heat map to determine whether the person is interacting with the object and how the person is interacting with the object.

In some embodiments, the pose estimation subnet 108 is implemented by taking an image as input and using a convolutional neural network in order to determine human joint locations. A pose estimation subnet 108 uses a convolutional neural network which has been trained to identify key points in order to determine human poses within an image. One example of a pose estimation subnet is a convolutional pose machine. This determination provides a joint-location heat map that can identify joint locations used to interact with objects, such as hands, feet, etc. In some embodiments, the heat map is the result of applying a Gaussian function. In other embodiments, the exact points for the joint locations are identified instead of a heat map.

In some embodiments, the object contact subnet 110 is implemented by accessing an input image 102 and using the object contact subnet 110 (e.g., a convolutional neural network) to determine object contact points. The object contact subnet 110 uses contact points for contact point determination. This determination provides a contact location heat map which can identify contact points on an object that a person can interact with, such as handles, pedals, etc. In some embodiments, the heat map is a result of applying a Gaussian function. In other embodiments, the exact points for the joint locations are identified instead of a heat map.

In some embodiments, the interaction-detection subnet 112 is implemented by taking the input image 102 along with the outputs from the pose estimation subnet 108 and object contact subnet 110 as inputs to determine the whether the person is interacting with the object. The joint-location heat map and contact location heat map are mapped to a separate image and processed through an interaction-detection subnet 112, such as a convolutional neural network, to estimate the human-object interaction and thereby generate the human-object interaction metadata 114.

In other embodiments, the input image 102 is additionally evaluated by a separate image evaluation convolution neural network 113 using original input image 102 data. The output of the image evaluation convolutional neural network is used in conjunction with the output of the interaction detection network to determine the human-object interaction metadata 114 used to transform the input image 102.

The image processing computing system 100 stores the searchable image 120 in a searchable image store 118. The searchable image store 118 is accessible, via one or more data networks, to one or more computing systems that utilize information about human object interactions. In some embodiments, the searchable image store 118 contains the image and fields likely to be used by an image search system 122 to retrieve the image or a user device 124 to search for an image. Examples of data stored in the searchable image store 118 includes objects and persons depicted within the searchable image 120, the human-object interaction metadata 114, the timestamp of the image, and other searchable fields.

An example of a computing system that utilizes information about human object interactions is an image search system 122 that services image queries or other searches from one or more user devices 124. Examples of the image search systems 122 include a server or group of servers configured in a distributed computing system (e.g., a grid, a cloud, etc.). Examples of a user device 124 include, but are not limited to, a personal computer, tablet computer, a desktop computer, a processing unit, any combination of these devices, or any other suitable device having one or more processors.

The image search system 122 receives input from the user device 124 containing search terms of the desired image. The image search system 122 then accesses the searchable image store 118 to perform the search. The searchable images 120 that provide the best match are transmitted to the user device 124.

In some embodiments, a training computing system 126 provides a trained interaction detection network 106 to the image-analysis engine 104. The training computing system 126 executes an interaction detection training engine 128 and thereby trains the interaction detection network 106 using training data 130. For example, the training data 130 could include training images of persons in proximity to objects (i.e., cropped image exemplars 132). In some embodiments, the cropped image exemplars 132 are randomly cropped at different scales centered around a human-object bounding box. By randomly cropping images at different scales, a larger quantity of training images are created and the interaction detection network 106 can be trained at different image scales. The interaction detection training engine 128 provides these training images as training inputs to the interaction detection network 106. Each training input include one of the training images and corresponding information about human-object interactions. The information associated with the training image includes metadata, such as a tag that states "carrying a bicycle by the handle," that describes interactions depicted within the training image.

In a training process, the interaction detection network 106 evaluates a training image and produces an output with an estimate of the human-object interaction. The interaction detection training engine 128 compares the output of the interaction detection network 106 to ground truth information associated with the training image. The ground truth information indicates whether the person is interacting with the object and how the person is interacting with the object. The interaction detection training engine 128 executes a loss function or other optimization function that compares output data having the estimate of the human-object interaction, as computed with the interaction detection network 106, to the ground truth information that identifies whether the person is interacting with the object and how the person is interacting with the object. The interaction detection training engine 128 calculates an error based on a difference between the estimate of the human-object interaction and the ground truth information included in the training data 130.

The interaction detection training engine 128 updates, based on the error, the parameters used by the interaction detection network 106 to estimate the human-object interaction. In some embodiments, the parameters are updated to decrease the difference between the calculated human-object interaction metadata 114 and the ground truth information. This process is repeated iteratively to optimize or otherwise improve the accuracy of the interaction detection network 106. This iteration terminates based on one or more termination conditions (e.g., the error converging to a value, the error falling below a threshold value for a certain network configuration, etc.). In the iterative process, the interaction detection training engine 128 modifies parameters such as the number of nodes in one or more subnets of the interaction detection network 106, connections between layers of the interaction detection network 106, weights used by the interaction detection network 106, etc.

In additional or alternative embodiments, the interaction detection training engine 128 uses user feedback to train the interaction detection network 106. For instance, a particular training image can be displayed at a user device 124 along with the human-object interaction metadata 114, which is generated with an interaction detection network 106. The user device 124 captures, with an input device, user input that provides feedback as to whether the human-object interaction metadata 114 is accurate. The user device 124 transmits the feedback (either directly or via one or more other systems) to the training computing system 126. The interaction detection training engine 128 adds the feedback data as ground truth information for a particular training image. The feedback-based ground truth information is used by the interaction detection training engine 128 to update one or more parameters of the interaction detection network 106 in the manner described above.

For illustrative purposes, FIG. 1 depicts the image processing computing system 100, the image search system 122, and the training computing system 126 as different computing systems. But other implementations are possible. In some embodiments, a single computing system can perform one or more of the operations described above with respect to the image processing computing system 100, the image search system 122, and the training computing system 126.

Figure 2:
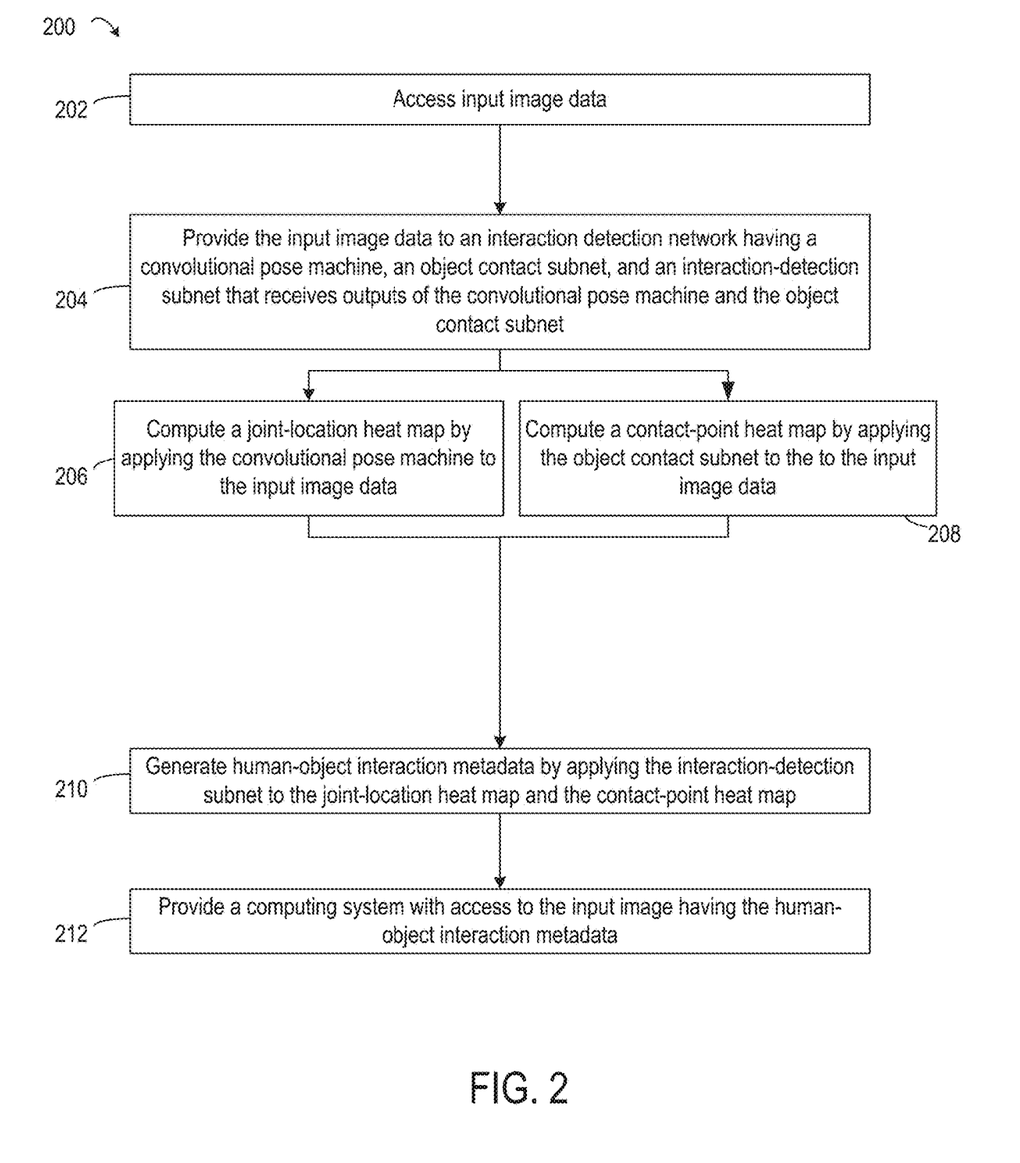
FIG. 2 depicts an example of a process for generating human-interaction metadata that describes or otherwise indicates human-object interactions detected in image content, according to certain embodiments of the present disclosure.

Examples of Enhancing Image Content with Interaction Detection Models that Identify Human-Object Interactions in the Image Content FIG. 2 depicts an example of a process 200, which may be performed by the image processing computing system 100 or another suitable computing system, for using an interaction detection network 106 to automatically detect human-object interactions in image content and thereby augment the image content with suitable tags or other human-object interaction metadata 114. For illustrative purposes, the process 200 is described with reference to certain examples depicted in the figures. For instance, in some embodiments, one or more processing devices implement operations depicted in FIG. 2 by executing suitable program code (e.g., the image-analysis engine 104). Other implementations, however, are possible.

At block 202, the process 200 involves accessing input image 102 data, such as an input image 102, one or more bounding boxes applied to the input image 102, or some combination thereof. One or more processing devices execute the image-analysis engine 104 (or suitable other program code) to implement block 202. Executing the image-analysis engine 104 causes one or more processing devices to access the input image 102 data that is stored in a non-transitory computer-readable medium. In some embodiments, accessing the input image 102 data involves communicating, via a data bus, suitable signals between a local non-transitory computer-readable medium and the processing device. In additional or alternative embodiments, accessing the input image 102 data involves communicating, via a data network, suitable signals between a computing system that includes the non-transitory computer-readable medium and a computing system that includes the processing device.

In some embodiments, the image-analysis engine 104 uses the process 200 to transform an input image 102 by applying human-object interaction metadata 114 to the input image 102, where the human-object interaction metadata 114 is generated by detecting one or more interactions between specific parts of a depicted human and specific parts of a depicted object. For instance, at block 204, the process 200 involves providing the input image 102 data to an interaction detection network 106 having a pose estimation subnet 108, an object contact subnet 110, and an interaction-detection subnet 112 that receives outputs of the pose estimation subnet 108 and the object contact subnet 110. One or more processing devices execute the image-analysis engine 104 or other program code to implement block 204. Executing the image-analysis engine 104 causes the processing device to perform an interaction-understanding algorithm. The interaction-understanding algorithm includes one or more sets of operations that implement the operations modeled by the interaction detection networks 106 described herein.

At block 206, the process 200 involves computing a joint-location heat map by applying the pose estimation subnet 108 to the input image 102 data. The joint-location heat map identifies one or more human joint locations in the input image 102. One or more processing devices execute the image-analysis engine 104 or other program code to implement block 206.

In some embodiments, the pose estimation subnet 108 evaluates an image to create a confidence map for each human joint location. The confidence map is iteratively refined to determine multiple joint locations in the image. In some embodiments, the pose estimation subnet 108 is a convolutional neural network that has been pre-trained using data known to produce effective models for performing human pose estimation.

At block 208, the process 200 involves computing a contact-point heat map by applying the object contact subnet 110 to the to the input image 102. The contact-point heat map identifies one or more contact points on the object depicted in the input image 102. One or more processing devices execute the image-analysis engine 104 or other program code to implement block 208.

In some embodiments, the object contact subnet 110 evaluates an image to create a confidence map for each contact point. The confidence map is iteratively refined to determine various contact points in the image. The iteratively refined confidence map corresponds to the contact-point heat map in the output of the object contact subnet 110. In some embodiments, the contact-point heat map produces multiple outputs. For example, one output may identify hand contact points, while a second output may identify foot contact points.

Figure 3:
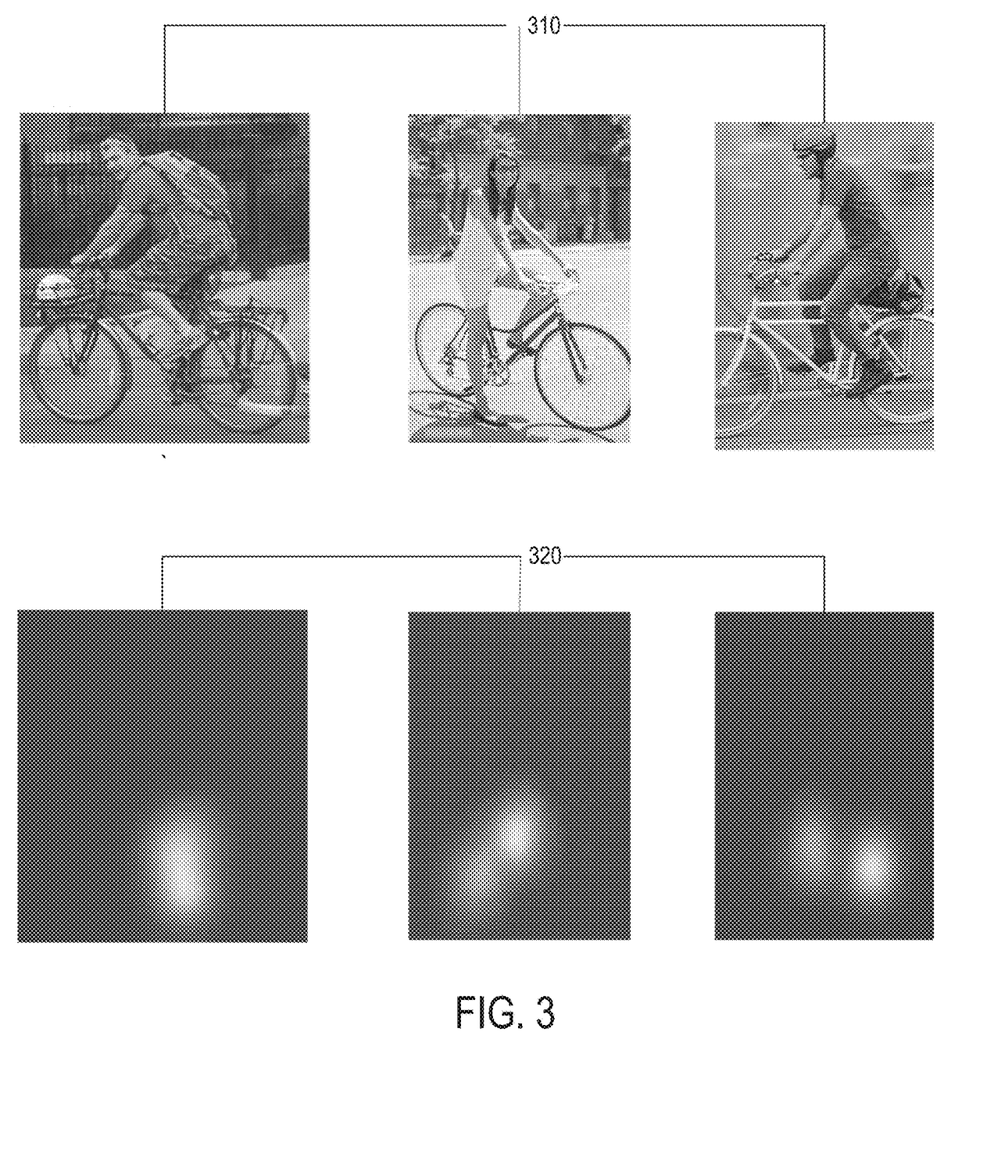
FIG. 3 depicts an example of input images and their corresponding object contact-point heat maps, according to certain embodiments of the present disclosure.

FIG. 3 shows an example of input images and their corresponding contact-point heat maps. In this example, input images 310 are images of people and bicycles. The object contact subnet 110 evaluates the images to refine a confidence map such that the foot contact point are determined and a contact-point heat map for foot contact points 320 is generated by the object contact subnet 110.

At block 210, the process 200 involves generating human-object interaction metadata 114 by applying the interaction-detection subnet to the joint-location heat map and the contact-point heat map. One or more processing devices execute the image-analysis engine 104 or other program code to implement block 210. For instance, the interaction detection network 106 is trained to identify an interaction based on joint-object contact pairs, where a joint-object contact pair includes a relationship between a human joint location and a contact point.

In some embodiments, the joint-location heat map and the contact-point heat map are combined into a single heat map image. This single heat map image is processed through a convolutional neural network in order to determine the human-object interaction metadata 114. In some embodiments, the dot product of each joint-location heat map and object contact-point heat map is computed in order to determine whether the joint location and the object contact point are in sufficiently similar locations. The dot product increases as the alignment between the joint-location map and the contact-point heat map increases. If the dot product exceeds a threshold dot product, the joint location and the contact point are in sufficiently similar locations.

The threshold dot product (i.e., a dot product sufficient to show that a joint location and a contact point are in sufficiently similar locations) can be determined through training of the interaction-detection subnet 112. In some embodiments, the interaction detection training engine 128 trains the interaction-detection subnet 112 using cropped image exemplars 132 retrieved from the training data 130. The cropped image exemplars 132 contain cropped input images along with ground truth information about the images, which can indicate whether the joint locations are in contact with the object contact locations. For each training image in a training set, the interaction-detection subnet 112 computes dot products between the joint-location heat map and the contact-point heat map. The interaction detection training engine 128 compares labels (or other ground truth information) for these cropped image exemplars 132 to dot products computed from the cropped image exemplars 132 in the training set. The interaction detection training engine 128 determines, from this comparison, relationships between the results of each dot product and the ground truth information for the cropped image exemplars 132. The interaction detection training engine 128 identifies or computes a threshold dot product based on these relationships. In a simplified example, the threshold dot product could be a minimum dot product (or some mathematical combination of the k smallest dot products) associated with joint and contact points being tagged as having similar locations.

At block 212, the process 200 involves providing a computing system with access to the input image 102 having the human-object interaction metadata 114. The image-analysis engine 104, as executed by one or more suitable processing devices, performs one or more output operations suitable for implementing block 212. In some embodiments, these output operations include providing an image search system 122 with access to the input image 102 having the human-object interaction metadata 114. For instance, a processing device of the image processing computing system 100 could transmit suitable commands to a searchable image store 118 (e.g., via a local data bus to a local memory device or via a data network to a remote data device) that cause the searchable image store 118 to store a searchable image 120, which could include an input image 102 corresponding to the input image 102 data of block 202 and the human-object interaction metadata 114 of block 210. In additional or alternative embodiments, these output operations transmitting the searchable image 120 from a first computing system, such as an image processing computing system 100 that executes the image-analysis engine 104, to a second computing system, such as an image search system 122, via one or more data networks for display or storage.

In some embodiments, an image search system 122 services queries using the searchable image store 118. For example, the image search system 122 receives input of search terms from the user device 124. The image search system 122 then accesses the searchable image store 118 to compare the image search terms to the searchable fields in the image search store. Each image is given a match score based on the degree of match between the search terms and the information contained in searchable fields and the human object interaction metadata and the search terms. The searchable images 120 that have the highest match scores are then transmitted to the user device.

Figure 4:
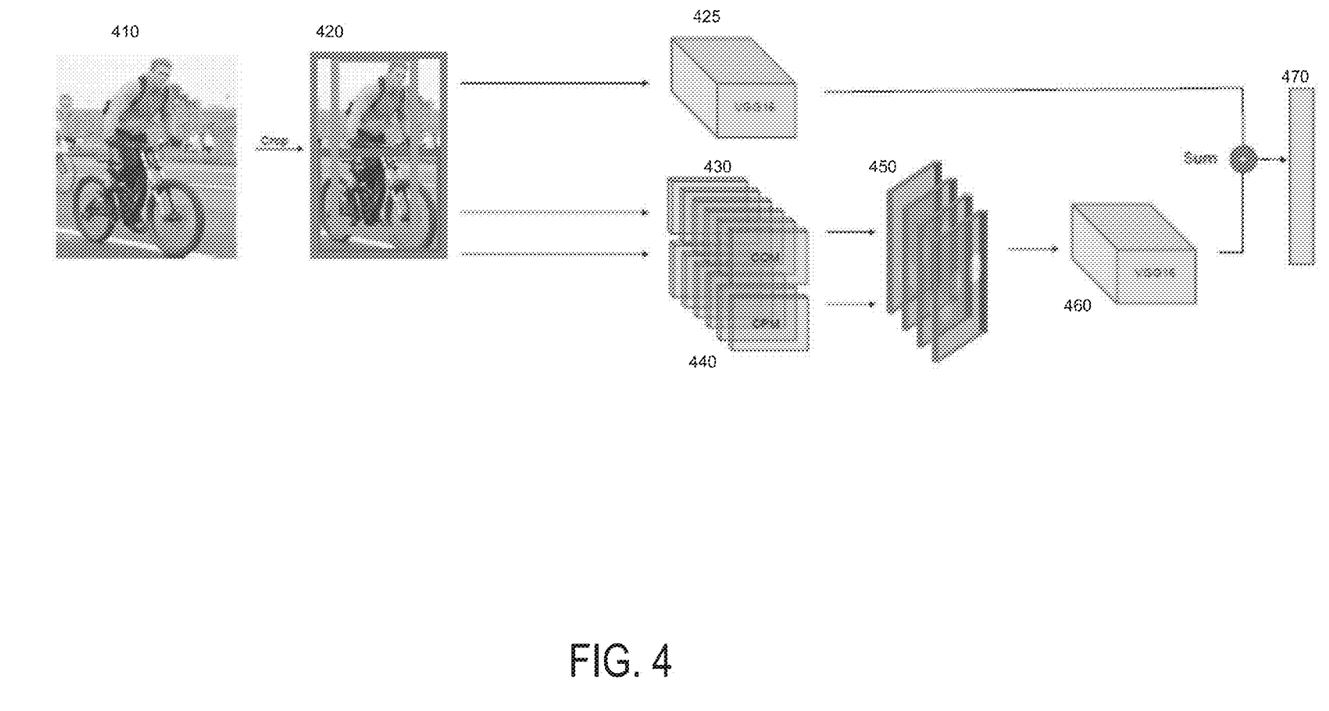
FIG. 4 depicts an example of an image being cropped and a human-object interaction is estimated, according to certain embodiments of the present disclosure.

FIG. 4 depicts an example of an image processing computing system being used to evaluate an input image 410. The input image 410 is cropped to generate a cropped image 420. The cropped image 420 centers the person and object from the input image 410. The cropped image 420 is used as input to a convolutional pose machine 440 (or other pose estimation subnet) and an object contact subnet 430. The output from the convolutional pose machine 440 and the object contact subnet 430 is used by the interaction-detection subnet 460. The interaction-detection subnet 112 combines the joint-location heat map and the contact location heat map into a combined heat map image 450. The interaction-detection subnet then processes the combined heat map image using an interaction-detection subnet 460 (e.g., a convolutional neural network) to determine the human object interaction score that is used to generate the human object interaction metadata 470. In some embodiments, the interaction-detection subnet 460 is implemented using a VGG-16 model. In some embodiments, the cropped image 420 is provided to an image evaluation network 425. The image evaluation network 425 produces a separate estimation score for the human object interaction. This score is combined with the human object interaction score produced by the interaction detection network to determine the human object interaction metadata 470.

Examples of Experimental Results

Figure 5:
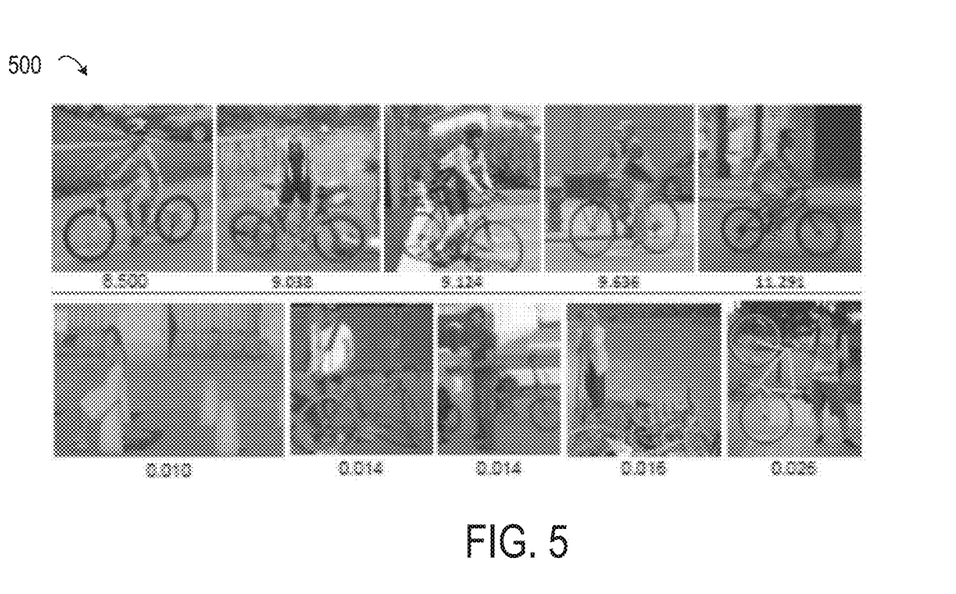
FIG. 5 depicts experimental results from the interaction detection network of images with high scores for hand-joint to hand-contact-point alignment and foot-joint to foot-contact-point alignment, according to certain embodiments of the present disclosure.
Figure 6:
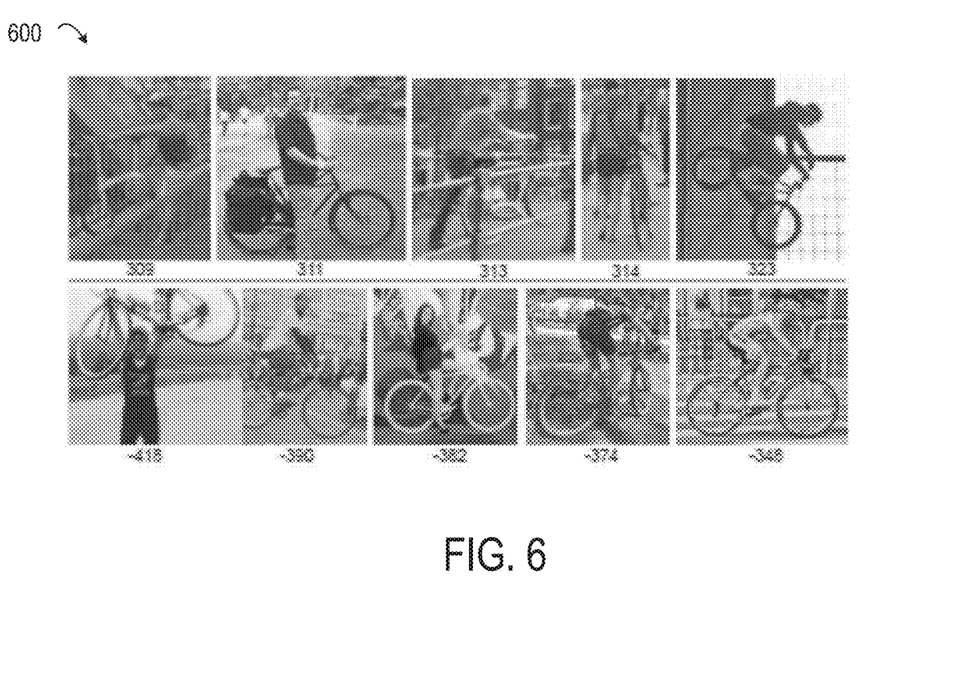
FIG. 6 depicts experimental results from the interaction detection network of images with high scores for hand-joint to hand-contact-point alignment and low-foot-joint to foot-contact-point alignment, according to certain embodiments of the present disclosure.

FIGS. 5 and 6 depict results from experiments involving certain embodiments of the interaction detection network 106 described herein. FIG. 5 depicts examples 500 of human-object interaction scoring using the interaction detection network 106. In this example, the interaction detection network 106 is looking for the greatest alignment between both hands and hand-contact points as well as foot and foot-contact points. The five highest results as determined by the interaction-detection subnet using the joint-location heat map and the contact location heat map are shown at the top. The five lowest results are shown at the bottom.

FIG. 6 depicts examples 600 where an action is identified by a high alignment with hand alignment with a hand-contact point, but with a low alignment between a foot and a foot-contact point. This is determined by identifying the largest difference between the hand to hand-contact point score and the foot to foot-contact point score. The five highest results are shown at the top. The five lowest results are shown at the bottom.

Example of a Computing System for Implementing Certain Embodiments

Figure 7:
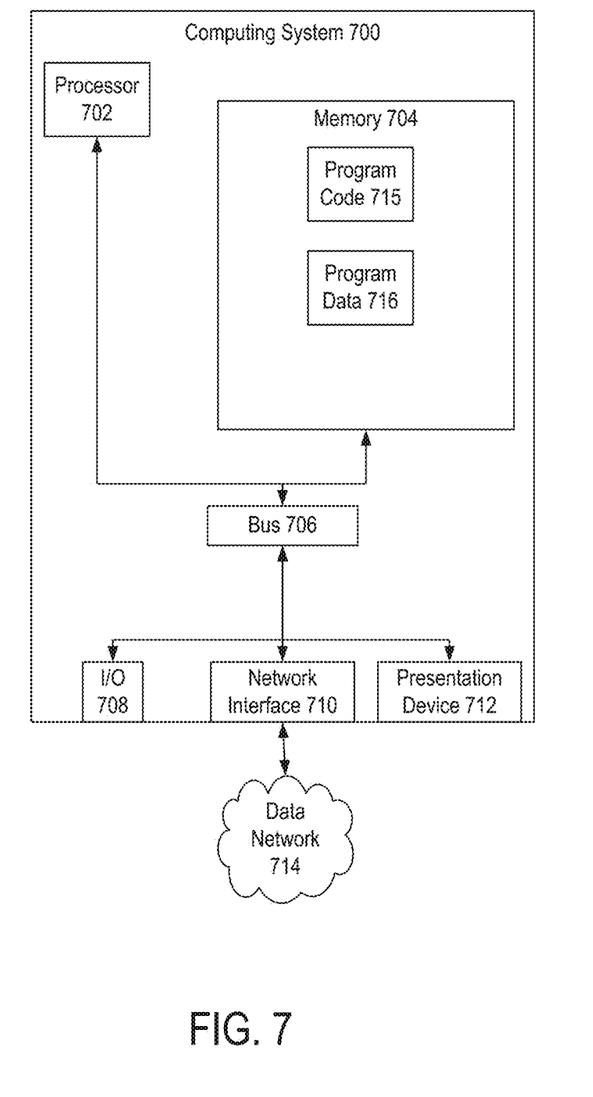
FIG. 7 depicts an example of a computing system for implementing one or more embodiments of the present disclosure.

Any suitable computing system or group of computing systems can be used for performing the operations described herein. For example, FIG. 7 depicts an example of the computing system 700. The implementation of computing system 700 could be used for one or more of an image processing computing system 100, an image search system 122, and a training computing system 126. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 715, program data 716, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices, such as a presentation device 712. One or more buses 706 are also included in the computing system 700. The bus 706 communicatively couples one or more components of a respective one of the computing system 700.

The computing system 700 executes program code 715 that configures the processor 702 to perform one or more of the operations described herein. Examples of the program code 715 include, in various embodiments, the image-analysis engine 104, the interaction detection training engine 128, or other suitable applications that perform one or more operations described herein (e.g., one or more query applications executed by an image search system 122). The program code may be resident in the memory device 704 or any suitable computer-readable medium and may be executed by the processor 702 or any other suitable processor.

The computing system 700 can access program data 716 (e.g., an input image 102 or other input image 102 data, a searchable image store 118 having searchable images 120, training data 130, etc.) in any suitable manner. In some embodiments, one or more of these data sets, models, and functions are stored in the same memory device (e.g., one of the memory devices 704). In additional or alternative embodiments, one or more of the programs, data sets, models, and functions described herein are stored in different memory devices 704 accessible via a data network.

The computing system 700 also includes a network interface device 710. The network interface device 710 includes any device or group of devices suitable for establishing a wired or wireless data connection to one or more data networks 714, via which communications with a user device 124 can occur. Non-limiting examples of the network interface device 710 include an Ethernet network adapter, a modem, etc. The computing system 700 is able to communicate with one or more other computing devices (e.g., a user device 124 executing a client application or a graphic manipulation application) via a data network 714 using the network interface device 710. Examples of the data network 714 include, but are not limited to, the internet, a local area network, a wireless area network, a wired area network, a wide area network, and the like.

In some embodiments, the computing system 700 also includes the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing system 700 using one or more data networks described herein. Other aspects can omit the presentation device 712.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes one or more processing devices performing operations comprising:
  accessing, from a memory device, an input image;
  transforming the input image by applying human-object interaction metadata to the input image that identifies a part of a human depicted in the input image being in contact with a part of an object depicted in the input image, wherein applying the human-object interaction metadata comprises:
  providing the input image to an interaction detection network having a pose estimation subnet, an object contact subnet, and an interaction-detection subnet,
  computing a joint-location heat map for the input image using the pose estimation subnet, the joint-location heat map identifying one or more human joint locations in the input image,
  computing a contact-point heat map for the input image using the object contact subnet, the contact-point heat map identifying one or more contact points on the object depicted in the input image,
  combining the joint-location heat map and the contact-point heat map into a combined heat map image, wherein the combined heat map image includes a joint-object contact pair, and wherein the joint-object contact pair comprises a relationship between a human joint location and a contact point, and
  generating the human-object interaction metadata for the combined heat map image using the interaction-detection subnet, wherein the interaction-detection subnet is trained to identify an interaction based on the joint-object contact pair; and
  providing access to the input image having the human-object interaction metadata.

2. The method of claim 1, the operations further comprising training the interaction-detection subnet, wherein training the interaction-detection subnet comprises:
  receiving, by the interaction-detection subnet, a plurality of training inputs, each training input comprising a training image and training human-object interaction metadata;
  computing, by the interaction-detection subnet, a calculated human-object interaction metadata from the plurality of training inputs;
  detecting, by a training computing system, a difference between the calculated human-object interaction metadata and the training human-object interaction metadata; and
  updating, by the training computing system, one or more parameters used to generate human-object interaction metadata, wherein updating the one or more parameters decreases a subsequent difference between the training human-object interaction metadata and subsequent human-interaction metadata calculated with the updated one or more parameters.

3. The method of claim 2, the operations further comprising:
  receiving, through an input device, feedback from a user device indicating whether the human-object interaction metadata is accurate; and
  updating, by the training computing system, one or more parameters used to generate human-object interaction metadata based on the feedback.

4. The method of claim 1, the operations further comprising servicing an image query using an image search system, wherein servicing the image query comprises:
  receiving, through an input device, the image query comprising one or more search terms;
  determining, by the image search system, a match score by comparing the human-object interaction metadata to the one or more search terms from the image query; and
  transmitting the input image to the image search system based on the match score exceeding a threshold.

5. The method of claim 1, wherein generating the human-object interaction metadata further comprises determining that the joint-object contact pair identifies a location of the human joint location and a location of the contact point to be sufficiently similar.

6. The method of claim 5, wherein determining that the joint-object contact pair to be sufficiently similar comprises determining that a dot product of the human joint location and the location of the contact point exceeds a threshold dot product.

7. The method of claim 1, wherein the transforming the input image further comprises:
  providing the input image to an image evaluation network; and
  determining, by the image evaluation network, an estimated human-object interaction, wherein generating the human-object interaction metadata further comprises combining the estimated human-object interaction with the identification of the interaction by the interaction-detection subnet.

8. A system comprising:
a processing device; and
a non-transitory computer-readable medium communicatively coupled to the processing device, wherein the processing device is configured to execute program code stored in the non-transitory computer-readable medium and thereby perform operations comprising:
  transforming an input image by applying human-object interaction metadata to the input image that identifies a part of a human depicted in the input image being in contact with a part of an object depicted in the input image, wherein applying the human-object interaction metadata comprises:
    providing the input image to an interaction detection network having a pose estimation subnet, an object contact subnet, and an interaction-detection subnet,
    computing a joint-location heat map for the input image using the pose estimation subnet, the joint-location heat map identifying one or more human joint locations in the input image,
    computing a contact-point heat map for the input image using the object contact subnet, the contact-point heat map identifying one or more contact points on the object depicted in the input image, wherein the one or more contact points represent a subset of the object that the human can interact with,
    generating the human-object interaction metadata by:
      (i) applying the interaction-detection subnet to the joint-location heat map and the contact-point heat map, wherein the interaction-detection subnet is trained to identify an interaction based on joint-object contact pairs, and wherein a joint-object contact pair comprises a relationship between a human joint location and a contact point, and
      (ii) determining that the joint-object contact pair identifies a location of the human joint location and a location of the contact point to be sufficiently similar; and
    providing a computing system with access to the input image having the human-object interaction metadata.

9. The system of claim 8, further comprising a training computing system configured for training the interaction-detection subnet, wherein training the interaction-detection subnet comprises:
  receiving, by the interaction-detection subnet, a plurality of training inputs, each training input comprising a training image and training human-object interaction metadata;
  computing, by the interaction-detection subnet, a calculated human-object interaction metadata from the plurality of training inputs;
  detecting a difference between the calculated human-object interaction metadata and the training human-object interaction metadata; and
  updating one or more parameters used to generate human-object interaction metadata, wherein updating the one or more parameters decreases a subsequent difference between the training human-object interaction metadata and subsequent human-interaction metadata calculated with the updated one or more parameters.

10. The system of claim 9, the operations further comprising:
  receiving, via an input device, feedback from a user device indicating whether the human-object interaction metadata is accurate; and
  wherein the training computing system is further configured for updating one or more parameters used to generate human-object interaction metadata based on the feedback.

11. The system of claim 8, further comprising an image search system configured for servicing an image query, wherein servicing the image query comprises:
  receiving the image query comprising one or more search terms;
  determining a match score by comparing the human-object interaction metadata to the one or more search terms from the image query; and
  transmitting the input image to the image search system based on the match score exceeding a threshold.

12. The system of claim 8, wherein applying the human-object interaction metadata further comprises combining the joint-location heat map and the contact-point heat map into a combined heat map image.

13. The system of claim 8, wherein determining that the joint-object contact pair to be sufficiently similar comprises determining that a dot product of the human joint location and the location of the contact point exceeds a threshold dot product.

14. The system of claim 8, wherein the transforming the input image further comprises:
  providing the input image to an image evaluation network; and
  determining, by the image evaluation network, an estimated human-object interaction, wherein generating the human-object interaction metadata further comprises combining the estimated human-object interaction with the identification of the interaction by the interaction-detection subnet.

15. A non-transitory computer-readable medium having program code that is stored thereon, the program code executable by one or more processing devices for performing operations comprising:
  a step for accessing an input image from a memory device;
  transforming the input image by applying human-object interaction metadata to the input image that identifies a part of a human depicted in the input image being in contact with a part of an object depicted in the input image, wherein applying the human-object interaction metadata comprises:
    providing the input image to an interaction detection network having a pose estimation subnet, an object contact subnet, and an interaction-detection subnet,
    a step for computing a joint-location heat map for the input image using the pose estimation subnet, the joint-location heat map identifying one or more human joint locations in the input image,
    a step for computing a contact-point heat map for the input image using the object contact subnet, the contact-point heat map identifying one or more contact points on the object depicted in the input image, wherein the one or more contact points correspond to a subset of an object that a person can interact with, and
    a step for generating the human-object interaction metadata by applying the interaction-detection subnet to the joint-location heat map and the contact-point heat map, wherein the interaction-detection subnet is trained to identify an interaction based on joint-object contact pairs, and wherein a joint-object contact pair comprises a location of a human joint location and a location of the contact point that includes a relationship between the human joint location and a contact point that is sufficiently similar; and
  a step for providing an image search system with access to the input image having the human-object interaction metadata.

16. The non-transitory computer-readable medium of claim 15, the operations further comprising training the interaction-detection subnet, wherein training the interaction-detection subnet comprises:
  receiving, by the interaction-detection subnet, a plurality of training inputs, each training input comprising a training image and training human-object interaction metadata;
  computing, by the interaction-detection subnet, a calculated human-object interaction metadata from the plurality of training inputs;
  detecting a difference between the calculated human-object interaction metadata and the training human-object interaction metadata; and
  updating one or more parameters used to generate human-object interaction metadata, wherein updating the one or more parameters decreases a subsequent difference between the training human-object interaction metadata and subsequent human-interaction metadata calculated with the updated one or more parameters.

17. The non-transitory computer-readable medium of claim 16, the operations further comprising:
  receiving, through an input device, feedback from a user device indicating whether the human-object interaction metadata is accurate; and
  updating, by the interaction-detection subnet, one or more parameters used to generate human-object interaction metadata based on the feedback.

18. The non-transitory computer-readable medium of claim 15, wherein generating the human-object interaction metadata further comprises determining that the joint-object contact pair identifies a location of the human joint location and a location of the contact point to be sufficiently similar.

19. The non-transitory computer-readable medium of claim 18, wherein determining that the joint-object contact pair to be sufficiently similar comprises determining that a dot product of the human joint location and the location of the contact point exceeds a threshold dot product.

20. The non-transitory computer-readable medium of claim 15, wherein the transforming the input image further comprises:
   providing the input image to an image evaluation network; and
   determining, by the image evaluation network, an estimated human-object interaction, wherein generating the human-object interaction metadata further comprises combining the estimated human-object interaction with the identification of the interaction by the interaction-detection subnet.

* * * * *